United States Patent [19]

Lundberg et al.

[11] 4,448,926

[45] May 15, 1984

[54] VISCOSIFICATION OF HYDROCARBON FLUIDS

[75] Inventors: Robert D. Lundberg, Bridgewater; Dennis G. Peiffer, East Brunswick, both of N.J.

[73] Assignee: Exxon Research and Engineering Co., Florham Park, N.J.

[21] Appl. No.: 416,926

[22] Filed: Sep. 13, 1982

[51] Int. Cl.$^3$ .................... C08F 8/36; C08L 23/32; C08L 53/00

[52] U.S. Cl. .................... 524/612; 524/606; 524/916

[58] Field of Search .................... 524/916, 612, 606

[56] References Cited

U.S. PATENT DOCUMENTS

| | | | |
|---|---|---|---|
| 4,130,517 | 12/1978 | Lundberg et al. | 524/606 |
| 4,282,130 | 8/1981 | Lundberg et al. | 524/916 |
| 4,285,851 | 8/1981 | Makowski et al. | 524/916 |
| 4,322,329 | 3/1982 | Lundberg et al. | 524/916 |
| 4,361,658 | 11/1982 | Lundberg et al. | 524/916 |

Primary Examiner—Ronald W. Griffin
Attorney, Agent, or Firm—Richard E. Nanfeldt

[57] ABSTRACT

The present invention relates to the gelation or viscosification of hydrocarbon fluids, wherein a polymer having the structure xB-[AB]$_n$-yA wherein the A block is hydrophobic and the B block is hydrophilic, n is an integer $\geq 1$, x and y are 0 to 1 and y is 1 when n is 1, is mixed with an aqueous phase at a critical concentration level of about 0.001 to about 5.0 grams of polymer per 100 ml. of the aqueous phase, more preferably about 0.01 to about 3.0, and most preferably about 0.01 to about 1.0, thereby obtaining a turbid suspension of the polymer in the aqueous phase; adding with stirring about 0.1 to about 15.0 wt % of a cosolvent to the turbid suspension, more preferably about 2.0 to about 15.0, and most preferably about 5.0 to about 15.0 to form an opalescent solution; stirring the opalescent solution for a sufficient period of time to ensure the formation of a uniform polymeric solution; adding the polymeric solution to a hydrocarbon liquid; and stirring for a sufficient period of time the mixture of polymeric solution and hydrocarbon liquid until phase separation occurs, wherein the hydrocarbon layer is a cloudy viscous pseudo-emulsion and the aqueous phase is clear and nonviscous.

9 Claims, No Drawings

VISCOSIFICATION OF HYDROCARBON FLUIDS

BACKGROUND OF THE INVENTION

1. Field of the Invention

The present invention relates to the gelation or viscosification of hydrocarbon fluids, wherein a polymer having the structure xB-[AB]$_n$-yA wherein the A block is hydrophobic and the B block is hydrophilic, n is an integer $\leq 1$, x and y are 0 or 1 and y is 1, when n is 1 is mixed with an aqueous phase at a critical concentration level of about 0.001 to about 5.0 grams of polymer per 100 ml. of the aqueous phase, more preferably about 0.01 to about 3.0, and most preferably about 0.01 to about 1., thereby obtaining a turbid suspension of the polymer in the aqueous phase; adding with stirring about 0.1 to about 15.0 wt.% of a cosolvent to the turbid suspension, more preferably about 2.0 to about 15.0, and most preferably about 5.0 to about 15.0 to form an opalescent solution; stirring the opalescent solution for a sufficient period of time to insure the formation of a uniform polymeric solution; adding the polymeric solution to a hydrocarbon liquid; and stirring for a sufficient period of time the mixture of polymeric solution and hydrocarbon liquid until phase separation occurs, wherein the hydrocarbon layer is a cloudy, viscous pseudo-emulsion and the aqueous phase is clear and nonviscous.

2. Description of the Prior Art

There are many applications for very viscous or gelled solutions of polymers in organic liquids which are quite diverse. There are also a number of physical and chemical techniques for preparing such systems. The present invention is concerned with a process for converting a relatively low viscosity organic liquid solution into a very viscous or gelled system via a rapid process which, under certain conditions, can be reversed.

The mechanism of gelation of the hydrocarbon phase, as defined in the instant invention, occurs by the formation of macroscopic, spherical, nonionic polymer membranes or films dispersed throughout a continuous hydrocarbon phase, wherein large volumes of the hydrocarbon solvent of the hydrocarbon phase are encapsulated within a series of minute polymer bags (i.e., pseudo-emulsion system).

The instant invention differs from a number of applications, Ser. Nos., 374,251; 374,197; 374,198; and 374,252, filed by D. G. Peiffer et al, one of the instant inventors. These previously filed applications were directed to the thickening (gelling) of an aqueous fluid by a water-insoluble, neutralized, sulfonated ionomer.

The potential applications for this process and the products derived therefrom will be evident in the instant application. Some of these applications are: for the formulation of greases; for the formulation of caulking materials; for the viscosification of paint removers; a process for forming a jellied gasoline; a method of solidifying and stabilizing unstable sand or soil formations such as shale; a process for solidifying low viscosity hydrocarbons as a means for cleaning up oil spills; and a process for viscosifying oils.

The viscosification of hydrocarbon fluids (gasoline-type fuel, jet fuel, hexane, heptane, decane, paraffinic oils, etc.) is normally achieved by the addition of moderate amounts of high molecular weight polymers. The degree of viscosity increase is dependent on the level of polymer additive as well as the polymer molecular weight. As a consequence, the achievement of high viscosity via this approach requires either very high levels of additive or extremely high molecular weights of the additive component. Either of these approaches very often has some marked disadvantages in that high levels of additive are often uneconomical, and the use of very high molecular weight additives gives rise to shear degradation and/or oxidative degradation which means that viscosities obtained are often unstable. In light of these problems, there is a need for alternative techniques that would provide substantial hydrocarbon fluid viscosification at much lower additive levels and with lower molecular weight components. There are a number of potential advantages via this approach such as improved economics, higher levels of viscosification, and less contamination of the hydrocarbon fluid by the additive.

The instant specification describes an approach using a specific class of polymers which permits viscosification of hydrocarbon fluid which is an oil-in-oil pseudo-emulsion stabilized by a polymer membrane suitably solvated at the interface.

In order to achieve this "oil-in-oil pseudo-emulsion", it has been observed that a polymer is required which is multiphase, containing a substantially hydrophilic block coupled with a substantially hydrophobic block. Under normal conditions, such a block copolymer would be phase separated and when immersed in water could provide an aqueous suspension, wherein the hydrophilic block is highly water soluble. If one places such a polymer in an aqueous phase at high polymer levels, i.e., 5%, essentially a water solvated gel results as described in U.S. Pat. No. 4,130,517. If one employs the polymer at a much lower level, i.e., 1%, then a turbid suspension is obtained, the exact nature of which depends on the specific polymer, the molecular weight, and its composition. The addition of a modest level of cosolvent (i.e., a solvent for the hydrophobic phase such as tetrahydrofuran) results in an improved solution, presumably because of preferential solvation of the hydrophobic phase.

The addition of a substantial volume of a hydrocarbon fluid to an aqueous solution of this preferred class of polymers accompanied by modest agitation results in substantial surface activity and the immediate formation of a very viscous hydrocarbon phase which appears to be an oil-in-oil pseudo-emulsion. The aqueous phase now appears as a nonviscous water layer. The viscosity is directly attributed to the large volume of the hydrocarbon solvent of the hydrocarbon phase encapsulated within a series of minute polymer spheres.

There are a broad class of polymers which could perform the function described above, and the preferred systems are described in U.S. Pat. No. 4,130,517. An especially preferred block copolymer is that with a hydrophilic block based on polyethylene oxide and the hydrophobic block based on polystyrene. There are a number of such polymer structures that can be prepared, but for the purpose of this invention and their structures, can be referred to as (AB)$_n$ or ABA where the A block is hydrophobic and the B block is hydrophilic. To be applicable for the instant invention, these materials would have preferably 50% of the polymer composition existing as a hydrophilic block (B block), although one can reduce this content down to 30% and still have an effective polymer system. It is also contemplated that polymers of at least 3 blocks are most preferred because they develop the required solubility characteristics and membrane strength characteristics desired for optimum performance.

The viscosification of hydrocarbon fluids has a very important technological objective currently demanded of hydrocarbons employed in greases, oil additives, drag reduction areas, demisting applications, oil well drilling, and oil well workover applications. Typically, polymer levels on the order of 1% up to 5% are required to be effective in these areas. Substantial viscosification can be achieved at 100 to 5000 parts per million of polymer additive; in the instant invention, this is a very substantial reduction in the amount of additive necessary for effective viscosification. It is anticipated that these fluids viscosified as described above will be useful in drag reduction applications, i.e., reduction of power required to drive a hydrocarbon fluid through an orifice; in the viscosification of jet fuels where there is a high level of interest in obtaining jet fuels which will not readily create a mist or vapor capable of explosion or combustion when such air craft are involved in accidental impact.

The instant invention differs from U.S. Ser. Nos. 106,027 (now U.S. Pat. No. 4,282,130, issued Aug. 4, 1981); 136,837 (now U.S. Pat. No. 4,322,329, issued Mar. 30, 1982); and 223,482 (now U.S. Pat. No. 4,361,658, issued Nov. 30, 1982) in that these aforementioned applications are directed to the gelation of hydrocarbon liquids by neutralized sulfonated thermoplastics, whereas the instant invention is directed to a class of unsulfonated polymers used as viscosity modifiers. In addition, the instant invention differs from a number of applications, Ser. Nos. 374,197; 374,198; 374,251; and 374,252, filed by D. G. Peiffer et al, one of the instant inventors. These previously filed applications were directed to the thickening of an aqueous fluid by a water-insoluble, neutralized sulfonated isomer.

SUMMARY OF THE INVENTION

The present invention relates to the gelation or viscosification of hydrocarbon fluids, wherein a polymer having the structure xB-[AB]$_n$-yA wherein the A block is hydrophobic and the B block is hydrophilic, n is an integer $\geq 1$, x and y are 0 or 1 and y is 1, when n is 1 is mixed with an aqueous phase at a critical concentration level of about 0.001 to about 5.0 grams of polymer per 100 ml. of the aqueous phase, more preferably about 0.01 to about 3.0, and most preferably about 0.01 to about 1.0, thereby obtaining a turbid suspension of the polymer in the aqueous phase; adding with stirring about 0.1 to about 15.0 wt.% of a cosolvent to the turbid suspension, more preferably about 2.0 to about 15.0, and most preferably about 5.0 to about 15.0 to form an opalescent solution; stirring the opalescent solution for a sufficient period of time to ensure the formation of a uniform polymeric solution; adding the polymeric solution to a hydrocarbon liquid; and stirring for a sufficient period of time, the mixture of polymeric solution and hydrocarbon liquid until phase separation occurs, wherein the hydrocarbon layer is a cloudy viscous pseudo-emulsion and the aqueous phase is clear and nonviscous.

Accordingly, it is a primary object of the instant invention to describe an economical process for forming a highly viscous or gelled hydrocarbon solution having a viscosity greater than about 50 cps, preferably greater than 500 cps.

GENERAL DESCRIPTION

The present invention relates to a process for the gelation of a hydrocarbon liquid which includes the steps of forming a turbid suspension of a polymer having the structure xB-[AB]$_n$-yA in an aqueous phase wherein A is a thermoplastic hydrophobic polymer block, B is thermoplastic hydrophilic polymer block, n is an interger $\geq 1$, x and y are 0 or 1, and y is 1, when n is 1; adding about 5.0 to about 10.0 wt.% of a cosolvent to the turbid suspension and stirring for a sufficient period of time to form a uniform polymeric solution; adding the polymeric solution to a hydrocarbon liquid; and stirring the mixture of hydrocarbon liquid and polymeric solution until phase separation occurs, wherein the aqueous phase is nonviscous and the hydrocarbon phase has a viscosity of 50 cps, preferably greater than 500 cps.

The present invention further relates to the formulation of greases; a process of filling asphalt pot holes; for the formulation of caulking materials, for the viscosification of paint removers; and process for forming a jellied gasoline; and a process for viscosifying oils.

If the boiling point of the organic liquid is greater than that of the water or the polar cosolvent, the solution or gel having a viscosity greater than 50,000 cps can be heated to a temperature greater than the boiling point of the water and the polar cosolvent, but less than that of the organic liquid, thereby isolating a pseudo-emulsion system of the block copolymer in the organic liquid when the polar cosolvent and water are boiled off. The formed pseudo-emulsion can be further heated to a temperature above the boiling point of the organic liquid, thereby removing part of the organic liquid from the liquid so as to cause formation of a more rigid system.

The component materials of the instant process generally include a block copolymer, a hydrocarbon liquid, polar cosolvent, and water.

SUMMARY OF THE INVENTION

The block copolymers having the general formula xB-[AB]$_n$-yA wherein n is an integer $\geq 1$, x and y are 0 or 1, and y is 1 when n is 1, A is a thermoplastic hydrophobic polymer block, and B is a thermoplastic hydrophilic polymer block. Preferably n is less than 100, more preferably less than 20. Both the A and the B blocks have a softening temperature (i.e., a glass transition or a crystalline melting point) of at least 35° C. The B block will comprise from about 30 to 97 wt.% of said copolymer, preferably from about 50 to 96 wt.%, and most preferably from about 70 to 95 wt.% of said total polymer. The B block will have an average molecular weight of at least 6,000, preferably at least 7,500, and most preferably 9,000. The average molecular weight of the A block will be at least 2,000, preferably at least 5,000, and most preferably from about 5,000 to 10,000. The polymers of the instant invention will have an average molecular weight ($\overline{M}_n$) of at least 10,000, preferably the average molecular weight ($\overline{M}_n$) will be at least 20,000, and most preferably, to provide the proper rheological characteristics desirable for melt fabrication, the average molecular weight will vary from about 25,000 to 500,000. It should be noted that molecular weight throughout this specification shall mean number average molecular weight.

The monomers which may be utilized to prepare the hydrophilic block include ethylene oxide, acrylamide, α-hydroxy-ethylmethacrylate and vinylpyrolidone. In general, those monomers which, when polymerized, yield water soluble homopolymers will be operative in this invention. However, the most preferred monomer is ethylene oxide because the polymers based on this monomer are most suited to commercial processes of polymer fabrication.

Throughout these discussions below, the hydrophilic or hydrophobic phases will be referred to by using the terminology "poly(monomer repeat unit)". Thus, the hydrophobic phase comprised of polystyrene will be referred to as such, although often these polymer blocks will be prepared from a glycol such as [α,ω] polystyrene glycol. This becomes important in the case of poly (ethylene oxide) which will often be derived from polyethylene glycol. Nevertheless, the monomer repeat unit in both cases is ethylene oxide. These terms will be used interchangeably when describing the hydrophilic phase, but when describing a specific experimental preparation, the appropriate chemical term will be employed.

In general, any monomer which may be polymerized to form a hydrophilic block may be utilized in the process of the instant invention. Copolymer blocks may also be employed as long as the total block is hydrophilic in character (i.e. soluble in water). Examples of such copolymer blocks are copolymers of ethylene oxide and propylene oxide, or ethylene oxide and 1,2-butylene oxide wherein the ethylene oxide comprises >80% by weight of the total polymer block. Preferably; however, the block is a homopolymeric block.

The monomers utilized to prepare the hydrophobic polymer block may be selected from the group consisting of styrene, t-butyl styrene, α-methyl styrene, vinyl toluene, methyl methacrylate, polyamides, such as the condensation polymers of hexamethylene diamine and adipic acid (nylon 6,6), methacrylonitrile, acrylonitrile, and polylactones (i.e. poly-ϵ-caprolactone).

The hydophobic block may also be made up of copolymer units so long as the total block is substantially hydrophobic, i.e., water insoluble. Once again, the preferred hydrophobic block will be a homopolymeric block.

It is also critical that the hydrophilic and hydrophobic blocks be substantially immiscible in each other.

The criticality of suitable phase separation in these block copolymers can be exemplified by comparing the products of the instant invention with those described in the prior art. For example, block copolymers of polystyrene glycols and polyethylene glycol (block polymers where the monomer repeat units are styrene and ethylene oxide, respectively) have been described wherein the polyethylene oxide blocks are relatively low in molecular weight, from 404 to 5,650. In particular, the polyethylene oxide block length represents an extremely important value because this polymer phase is the preferred continuous phase for these systems.

The properties of the polymers of the instant invention are determined by the polymer present as the continuous phase, and it is desired for this invention that the polyethylene oxide or hydrophilic block represents the continuous phase. Therefore, it is obvious that the polyethylene oxide phase must develop a high degree of crystallinity in order that the resulting product is a multiphase plastic. In order that this be achieved, a minimum molecular weight for this phase must be in excess of 6,000, preferably in excess of 7,500, and most preferably in excess of 9,000.

The molecular weight of the hydrophobic phase is less critical, just so long as it forms a well-defined separate phase. In general, this is achieved with a polymer block of at least 2,000 in molecular weight, and preferably at least about 5,000. In the case of a polystyrene phase for example, suitable phase separation is manifested with block molecular weights as low as 5,000 to 10,000.

As discussed previously, it is known that polyethylene oxide may be combined with polystyrene to form two block copolymers of the AB type, where A is polystyrene and B is polyethylene oxide, said two block copolymers being useful as antistatic agents. These compositions, as well as these block copolymers, wherein polyethylene oxide blocks are terminal and polystyrene is the center block, are not within the scope of the instant invention since the optimum properties as a viscosity retaining pseudo-emulsion are not obtained unless the specific type block polymers as represented above are utilized. The preferred compositions of the instant invention are ABA copolymers wherein A and B are as previously described. For example, poly(piperazine-sebacamide)-polyethylene oxide-poly(piperazine-sebacamide), poly(hexamethylene diamine-adipic acid)-polyethylene oxide-poly(hexamethylene diamine-adipic acid), polystyrene-polyacrylamide-polystyrene, polystyrene-polyvinyl pyrrolidone-polystyrene, polyacrylonitrile-polyethylene oxide-polyacrylonitrile, poly-t-butyl styrene-polyethylene oxide-poly-t-butyl styrene, polyvinyl toluene-polyethylene oxide-polyvinyl toluene, polymethylmethacrylate-polyethylene oxide-polymethylmethacrylate, polymethacrylonitrile-polyethylene oxide-polymethacrylonitrile, etc. are preferred compositions within the scope of the instant invention.

It is important to emphasize that the block or graft polymers of this invention always have at least one hydrophilic polymer block in the interior of the polymer chain, i.e., the center block of a three-block copolymer, or one of the two interior blocks of a four-block copolymer.

The two-phase nature of these block copolymers arises from the incompatibility of the hydrophobic and hydrophilic phases. The composition of the block copolymer in terms of the hydrophobic/hydrophilic balance has a major effect on the polymer properties. For most of the applications for which these block polymers are being utilized, it is desirable that the hydrophilic phase exist as the continuous phase with the hydrophobic phase being dispersed as the domains. This is achieved most readily if the hydrophilic phase exists as the predominant phase.

The xB-[AB]$_n$-yA block copolymers can be prepared by several different techniques. The choice of the A and B polymer block is limited by the above parameters and polymerization chemistry. Several acceptable procedures are as follows. Poly(ethylene oxide) of suitable molecular weight and capped at each end with hydroxyl groups (commercially available as polyethylene glycols or Carbowaxes (Union Carbide Corporation) can be reacted readily with diisocyanates (toluene diisocyanate or similar diisocyanates). Normally 2 moles of diisocyanate are added per mole of polyethylene glycol so that the resulting product is an isocyanate capped intermediate. This material is then reacted in approximately equimolar quantities with a polystyrene glycol of suitable molecular weight under suitable conditions. The resulting high molecular weight block copolymers comprising segments of polyethylene oxide and polystyrene are polyurethanes of a special type. Such materials are not normally contaminated by any substantial amounts of homopolymer segments, and are extremely useful as a viscosity modifier discussed in this invention.

However, the urethane linkages contained in these block copolymers can discolor during exposure to light. To circumvent the use of urethane linkages, the polymers can be prepared by a two-stage process. Consider the preparation again of a polystyrene-polyethylene oxide product. The BAB segment is first formed by well-known anionic techniques with B blocks [poly(ethylene oxide)] being one-half the desired final block length. This BAB segment may either be terminated by hydroxy groups or metal alkoxides at both ends. Once the BAB prepolymer described above is formed, it can be reacted with diacid chlorides such as phosgene, adipoly chloride and sebacoyl chloride to give alternating block copolymers. These reactions are summarized by the following equations:

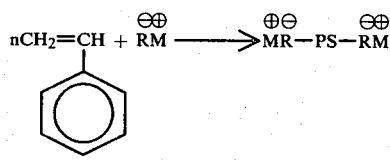

where RM is a suitable organometallic initiator, PS is a polystyrene block of suitable molecular weight determined by the ratio of styrene monomer to organometallic initiator.

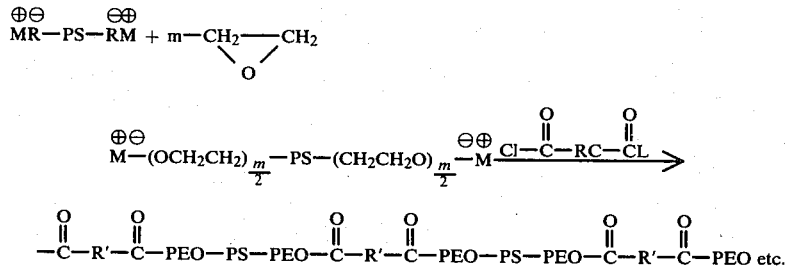

The PEO (polyethylene oxide) units are combined with other PEO units to create a segment which is substantially a total PEO block except for a small amount of coupling agent. This means that the molecular weight of the PEO block before coupling would be effectively doubled after coupling. The coupling agent represents such a small component of the total PEO block that the combined block operates as a single crystallized unit. A by-product metal chloride salt is removed from the polymer by extraction or can be left in. These polymers do not readily discolor. However, the requirements for the total PEO block length described above must still be met in order to achieve a multiphase plastic suitable as a viscosity modifier.

The two processes described above are suitable for making multiphase plastics combining hydroxyl terminated hydrophilic blocks with those hydrophobic blocks, preferably those obtained by vinyl polymerization, such as polyethylene oxide and polystyrene, respectively. A third process can be considered as desirable for combining hydrophilic polymer blocks with hydrophobic polymer blocks, especially those obtained by condensation polymer techniques. This latter process is especially desired for it permits use of polyamide blocks terminated by amines, which are readily available.

First, the hydrophilic polymer block is reacted with diisocyanates as described above. Diisocyanates suitable for this reaction are those widely used in polyurethane technology. The capped poly(ethylene oxide) is then reacted with polyamides, terminated at both ends with amine functionality, to give block polymers consisting of hydrophilic and hydrophobic segments joined by urea linkages. The following equations describe this chemistry in general terms:

HO—PEO'—OH+OCN—R—NCO→OC-
N—PEO'—NCO where PEO' represents polyethylene oxide and PEO' represents polyethylene oxide segments of higher molecular weight due to some condensation through urethane linkages

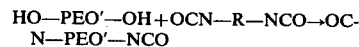

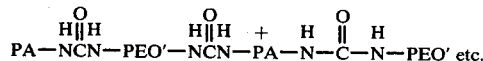

where PA represents polyamide segments.

The organic liquids, which may be utilized in the instant invention, are selected with relation to the block copolymer and vice-versa. The organic liquid is selected from the group consisting of oils, gasoline, aromatic hydrocarbons, cyclic aliphatic ethers, alipatic ethers, or organic aliphatic esters and mixtures thereof.

Specific examples of organic liquids to be employed with the various types of polymers are:

Benzene, toluene, ethyl benzene, styrene, xylene and aromatic solvents. Dioxane, tetrahydrofuran and cyclic aliphatic ether solvents. N-pentyl ether, n-butyl ether, n-amyl ether and aliphatic ether solvents. Ethyl acetate, n-butyl acetate and organic aliphatic esters.

The method of the instant invention includes incorporating a polar cosolvent, for example, a polar cosolvent into the mixture of water and block copolymer to solubilize the hydrophilic groups. The polar cosolvent will have a solubility parameter of at least 10.0, more preferably at least 11.0 and is water miscible and may comprise from 0.1 to 4, preferably 0.5 to 2 wt.% of the total mixture of water, block copolymer and polar cosolvent. The solvent system of polar cosolvent and water in which the block copolymer is dissolved, contains less than about 15 wt.% of the polar cosolvent, more preferably about 2 to about 15 wt.% and most preferably about 5 to about 15 wt.%. The viscosity of the solvent system is less than about 1,000 cps, more preferably less than about 800 cps and most preferably less than about 50 cps.

Normally, the polar cosolvent will be a liquid at room temperature; however, this is not a requirement. It is preferred, but not required that the polar cosolvent be soluble or miscible with the organic liquid at the levels employed in this invention. The polar cosolvent is selected from the group consisting of water soluble alcohols, amines, di- or trifunctional alcohols, amides, acetamides, phosphates, or lactones and mixtures thereof. Especially preferred polar cosolvents are aliphatic alcohols such as methanol, ethanol, n-propanol, isopropanol, 1,2-propane diol, monoethyl ether of ethylene glycol, and n-ethylformamide.

The concentration of block copolymer in the aqueous phase is about 0.001 to about 5.0 grams of block copolymer per 100 ml. of the aqueous phase, more preferably about 0.01 to about 3.0, and most preferably about 0.01 to about 1.0.

The amount of formed polymeric solution added to the hydrocarbon liquid is about 1.0 to about 50.0 parts by volume per 100 parts of the hydrocarbon liquid, more preferably about 10.0 to about 50.0, and most preferably about 20.0 to about 50.0.

DESCRIPTION OF THE PREFERRED EMBODIMENTS

EXAMPLE 1

A block copolymer based on poly(ethylene oxide) and polystyrene was prepared according to the following precedure:

To a 2-liter flask was charged 1000 ml. freshly distilled tetrahydrofuran and 0.0121 moles K-dianion of α-methyl styrene. While under a dry nitrogen blanket, the contents were cooled to 0° C. and 22.7 g. styrene added. Polymerization of styrene began immediately and was allowed to react for 1 hour.

Then 204.3 g. ethylene oxide (distilled twice from $CaH_2$) was slowly added. The previously reddish solution became colorless and extremely viscous after the addition of about 20 ml. of ethylene oxide. After 24 hours, 2.9056 g. sebacoyl chloride was added slowly (dropwise) over a 2-hour period. After an additional 3 hours, the polymer was precipitated in an excess of n-heptane, filtered and dried under vacuum for 18 hours at 40° C.

This copolymer contained approximately 90% polyethylene oxide and had an estimated number average molecular weight of 24,000 as established by membrane osmometry. The structure of this polymer is represented by PS—PEO—PS and; therefore, it is a three-block copolymer with terminal blocks of polystyrene.

0.100 grams of the PEO—PS block copolymer was added to 90 ml. of distilled water and stirred for three hours. The polymer did not dissolve; the resulting solution was turbid and nonviscous. About 10 ml. of tetrahydrofuran was added and the solution appeared "opalescent" suggesting the THF had solvated the PS blocks.

Twenty-five ml. of this polymer solution was added to 25 ml. of decane and the mixture agitated vigorously. After about 15 minutes some phase separation occurred, and the upper layer (hydrocarbon) was a cloudy viscous emulsion while the lower layer was clear and nonviscous. The volume of the upper layer was determined to be 30 ml. after one hour, and the lower layer volume was 20 ml.

The viscosity of the upper layer was determined with a Brookfield Viscometer. To obtain sufficient volume of solution, a second experiment was conducted and the upper layers combined to provide the required 50 ml. of solution.

The values obtained at 25° C. with No. 2 spindle were:

| RPM | Viscosity, Centipoise |
|---|---|
| 30 | 486 |
| 12 | 862 |
| 6 | 1380 |
| | After 15 minutes |
| 6 | 2275 |

These experiments confirm the substantial viscosification of the hydrocarbon phase by use of the appropriate polymers.

EXAMPLE 2

0.1 g. of the PEO—PS block copolymer from Example 1 was dissolved into a 90% water per 10% tetrahydrofuran solution as prescribed in Example 1. 25 ml. of this polymer solution was added to 25 ml. of cyclohexane and the mixture was agitated. Within a short period of time (approximately 10 minutes), phase separation occurred with the upper cyclohexane layer believed to contain most of the block polymer in the form of a cyclohexane-in-cyclohexane (i.e., hydrocarbon-in-hydrocarbon) pseudo-emulsion system. The lower aqueous layer was not viscosified while the hydrocarbon layer has the following viscosity characteristics:

| RPM | Viscosity, Centipoise |
|---|---|
| 12 | 1800 |
| 30 | 920 |
| 60 | 560 |

As in Example 1, this experiment confirms that substantial viscosification of a hydrocarbon phase (in this instance cyclohexane) is achieved with a low level of polymer.

It is readily apparent from this example that the hydrocarbon solvent which is viscosified should be relatively insoluble in the aqueous phase.

EXAMPLE 3

To determine whether a similar viscosification would be achieved with polyethylene oxide homopolymer, the above experiment was repeated using a commercial PEO sample from Union Carbide UCC-WSR-205. Under these conditions, the decane-polymer solution mixture gave rapid phase separation with no evidence of viscosification of either phase.

EXAMPLE 4

A 0.5 g/l aqueous solution containing polyethylene oxide (Union Carbide's Polyox-900,000 molecular weight) was mixed and agitated vigorously with a 0.5 g/l polystyrene/tetrahydrofuran solution. In this experiment, 25 ml. of each solution was used. The polymers immediately precipitated from solution leaving behind a relatively clear liquid phase. The viscosity of this solution did not increase to any significant extent. Addition of 25 ml. of decane to the above solution resulted only in liquid phase separation.

This experiment shows that the homopolymers of the PEO—PS copolymer dissolved in the appropriate solvent systems did not interact to give viscosification characteristics previously described in Example 1.

What is claimed is:

1. A process for gelation of a hydrocarbon liquid, which comprises the steps of:
   (a) forming a turbid suspension of a water insoluble block copolymer in an aqueous phase, said block copolymer having the formula:

wherein B is a thermoplastic hydrophilic polymer block, A is a thermoplastic hydrophobic polymer block, n is an integer $\geq 1$, x and y are 0 or 1, and y is 1 when n is 1;
   (b) adding a polar cosolvent to said turbid solution;
   (c) mixing the cosolvent and turbid suspension until a polymeric solution has formed;
   (d) adding said polymeric solution to a hydrocarbon liquid; and
   (e) mixing the polymeric solution and hydrocarbon liquid until phase separation occurs, wherein said hydrocarbon liquid has gelled.
   (f) removal of said aqueous liquid from said hydrocarbon fluid.

2. A process according to claim 1, wherein said block copolymer has polystyrene and poly(ethylene oxide) blocks.

3. A process according to claim 2, wherein said poly(ethylene oxide) blocks comprise at least 30% of said block copolymer.

4. A process according to claim 1, wherein a concentration of said block copolymer in said aqueous phase being about 0.001 to about 5.0 grams per 100 ml of said aqueous phase.

5. A process according to claim 4, wherein about 0.1 to about 15.0 wt.% of cosolvent is added to said turbid suspension.

6. A process according to claim 5, wherein said polar cosolvent is selected from the groups consisting of water soluble alcohols, amines, di- or trifunctional alcohols, amides, acetamides, phosphates and lactones, and mixtures thereof.

7. A process according to claim 1, wherein said hydrocarbon liquid is selected from the group consisting of oils, gasoline, aromatic hydrocarbons, cyclic aliphatic ethers, aliphatic ethers and organic aliphatic esters, and mixtures thereof.

8. A process according to claim 1 wherein said polar cosolvent has a solubility parameter of at least about 10 and is water soluble.

9. The product prepared by the process of claim 1.